United States Patent
Lazarut et al.

(10) Patent No.: US 7,376,917 B1
(45) Date of Patent: May 20, 2008

(54) CLIENT-SERVER SEMICONDUCTOR VERIFICATION SYSTEM

(75) Inventors: Aurelian Vasile Lazarut, Co. Dublin (IE); Amr Yahia El Monawir, Saggart Abbey (IE); Jason Lawlor, Tallaght (IE); David A. McNicholl, Dundalk (IE)

(73) Assignee: Xilinx, Inc., San Jose, CA (US)

( * ) Notice: Subject to any disclaimer, the term of this patent is extended or adjusted under 35 U.S.C. 154(b) by 151 days.

(21) Appl. No.: 10/648,124

(22) Filed: Aug. 25, 2003

(51) Int. Cl.
  *G06F 17/50* (2006.01)
(52) U.S. Cl. .................. 716/4; 716/5; 716/6; 714/724; 714/725; 703/20
(58) Field of Classification Search ............... 716/4–6; 714/25–27, 724–725; 703/20
See application file for complete search history.

(56) References Cited

U.S. PATENT DOCUMENTS

| | | | |
|---|---|---|---|
| 4,875,006 A * | 10/1989 | Henley et al. ................ 324/97 |
| 5,425,036 A | 6/1995 | Liu et al. |
| 5,475,624 A * | 12/1995 | West .......................... 703/15 |
| 5,682,472 A * | 10/1997 | Brehm et al. ................ 714/25 |
| 5,684,808 A * | 11/1997 | Valind ........................ 714/726 |
| 5,910,895 A * | 6/1999 | Proskauer et al. .......... 700/121 |
| 5,913,022 A * | 6/1999 | Tinaztepe et al. ............ 714/25 |
| 6,016,563 A | 1/2000 | Fleisher |
| 6,061,283 A | 5/2000 | Takahashi et al. |
| 6,331,770 B1 | 12/2001 | Sugamori |
| 6,363,517 B1 * | 3/2002 | Levi et al. ..................... 716/6 |
| 6,363,519 B1 * | 3/2002 | Levi et al. .................... 716/16 |
| 6,378,122 B1 * | 4/2002 | Levi et al. .................... 716/16 |
| 6,393,591 B1 * | 5/2002 | Jenkins et al. .............. 714/725 |
| 6,430,736 B1 * | 8/2002 | Levi et al. .................... 716/17 |
| 6,446,867 B1 * | 9/2002 | Sanchez ..................... 235/454 |
| 6,499,115 B1 * | 12/2002 | Wiedeman et al. ........... 714/30 |
| 6,539,532 B1 * | 3/2003 | Levi et al. .................... 716/16 |
| 6,678,645 B1 * | 1/2004 | Rajsuman et al. ............ 703/20 |
| 6,681,351 B1 * | 1/2004 | Kittross et al. ............. 714/724 |
| 6,711,616 B1 | 3/2004 | Stamm et al. |
| 6,724,730 B1 * | 4/2004 | Mlinarsky et al. .......... 370/241 |
| 6,754,763 B2 * | 6/2004 | Lin ............................ 710/317 |
| 6,826,721 B2 * | 11/2004 | Williamson et al. ........ 714/725 |

(Continued)

OTHER PUBLICATIONS

Xilinx, Inc., "Speed Up Verification of Long Transaction Sequences with MicroBlaze Soft Processors"; Xcell Journal; Fall/Winter 2001; available from Xilinx, Inc., 2100 Logic Drive, San Jose, California 95124, pp. 34-35.

(Continued)

*Primary Examiner*—Jack Chiang
*Assistant Examiner*—Naum Levin
(74) *Attorney, Agent, or Firm*—John J. King (57) ABSTRACT

A client-server semiconductor verification system is described. The system comprises a client device storing a test job having test vectors and configuration data for programmable logic for testing a design of a logic circuit. A server is coupled to the client device and receives the test job from the client device. Finally, a system under test coupled to the server and has programmable logic which is reconfigured. The system under test receives the test vectors and outputs result vectors to the client device by way of the server. Corresponding methods are also disclosed.

8 Claims, 5 Drawing Sheets

U.S. PATENT DOCUMENTS

| | | | |
|---|---|---|---|
| 6,874,107 B2* | 3/2005 | Lesea | 714/725 |
| 7,089,466 B2* | 8/2006 | Odom et al. | 714/724 |
| 7,185,254 B2* | 2/2007 | Ishida et al. | 714/738 |
| 7,185,295 B2* | 2/2007 | Park et al. | 716/4 |
| 2002/0121913 A1* | 9/2002 | Miller et al. | 324/760 |
| 2003/0110430 A1* | 6/2003 | Bailis et al. | 714/725 |
| 2003/0217341 A1* | 11/2003 | Rajsuman et al. | 716/4 |
| 2004/0123258 A1* | 6/2004 | Butts | 716/5 |

OTHER PUBLICATIONS

Xilinx, Inc.; "Bring on the Music—But Take out the Noise"; Xcell Journal; Spring 2002; available from Xilinx, Inc., 2100 Logic Drive, San Jose, California 95124, 2 pp.

HARDI Electronics AB; "HARDI ASIC Prototyping Board"; available at www.hardi.se; one page.

Mentor Graphics; "Co-Modeling Solutions"; Data Sheet'available at www.mentor.com/emulation; two pages.

Aldec. "Desktop Prototyping Board—Testing the Possibilities of HDL Desktop"; available from www.aldec.com; two pages.

HARDI Electronics AB; "HARDI ASIC Prototyping System"; available at www..hardi.se; one page.

Mentor Graphics; "iSOLVE In Circuit Verification Solutions"; Data Sheet; available at www.mentor.com; two pages.

Experience First, Inc; "X1, Raptor 1.5 Virtex-E" Product Brief; available from Experience First, 3275 Stevens Creek Blvd., Suite 220, San Jose, CA 95117; one page.

EXP First, Inc.;Raptor/ISD; Aug. 8, 2003; four pages.

Experience First, Inc.; "Raptor/ISD 100"; Product Debut, Limited Release; May 2001; available at www.expfirst.com; one page.

Stohr, Bernd et al.; "A Complete SoC verification framework accelerating productivity through reuse and automation"; 9 pages.

IKOS Systems, Inc.; Test Expert, "The Complete Verification Solution for Communication Designs"; Preliminary Data Sheet; available at www.ikos.com; two pages.

Mentor Graphics; "VStations-15M High-Performance System Integration Verification"; Data Sheet; available at www.mentor.com/emulation; two pages.

Mentor Graphics; "VStations-30M High-Performance System Integration Verification"; Data Sheet; available at www.mentor.com/emulation; four pages.

Xilinx, Inc.; "FlexBench Tool Suite Relies on Xilinx Silicon and Software"; Xcell Journal; Spring 2002; available from Xilinx, Inc., 2100 Logic Drive, San Jose, CA 95124; four pages.

EXP First, Inc.; Xcell Magazine Article Warren Miller, Rev 1.2; "A Hardware Reference Design for Xilinx Reed-Solomon LogiCore—Uses New IP Development Environment to Accelerate Simulation and Development"; Aug. 8, 2003; three pages.

* cited by examiner

CLIENT-SERVER SEMICONDUCTOR VERIFICATION SYSTEM

FIELD OF THE INVENTION

The present invention relates generally to a semiconductor design verification system, and in particular, to a system for and method of verifying a digital semiconductor design.

BACKGROUND OF THE INVENTION

Circuit design verification can require significant time and costly equipment, including both software and hardware. Currently, a behavioral description and test bench in hardware description language (HDL) are created for a design of a semiconductor device. Even if a behavioral description is not created, the design is coded in register transfer level (RTL) and simulated using a testbench. When the design is implemented in a target architecture, lengthy simulations using timing and functional models of the target architecture are run. As designs and technology are becoming more complex, the time required to run these simulations is becoming increasingly long. Although hardware accelerators and hardware emulators are helpful in verifying the design of a semiconductor device, these systems are typically quite expensive. In particular, licenses for software simulators and accompanying hardware peripherals can be prohibitively expensive.

Some of the high cost of these systems comes from the complexity of mapping designs onto the target architecture, especially for emulation systems. Although hardware accelerators are cheaper than emulators because they carry out simulation loading in vendor specific implementation models including timing information, their functionality is limited. That is, the format of the input data is limited to a format specific to the vendor.

Similarly, hardware prototype systems also have a number of drawbacks. Hardware prototype systems are usually in the form of logic analysis tools, from which it is possible to generate, apply and sample stimuli with any semiconductor system having digital inputs and outputs via test probes. However, these systems are not well suited for functional verification.

Accordingly, there is a need for an improved system and method for verifying a semiconductor design.

SUMMARY OF THE INVENTION

The systems and methods described in the present disclosure relate to a client/server semiconductor and prototype verification system. The systems provide an inexpensive means for generating and running test vectors at high speed on actual hardware compared to running lengthy software simulations for the purpose of design and prototype functional verification. A test job could be generated in a software environment on a client system. The test job would preferably contain test vectors that would be applied to a semiconductor System Under Test (SUT). The test vectors may be generated using dedicated software or via an API or scripting technique, or determined based upon software behavioral simulations of their design running on external simulation tools. Expected result vectors, which can also be extracted from the results of the software simulation, can be used as reference vectors.

The systems of the various embodiments of the present invention can be used to create vectors either from their software simulation environment or via alternative methods, and preferably apply these vectors to an unmodified design running on the actual target technology and sample the targets response. Such targets can be any digital system with inputs and outputs. Some specific examples of targets include programmable logic devices (PLD) such as field programmable gate arrays (FPGA).

DETAILED DESCRIPTION OF THE DRAWINGS

The systems and methods of embodiments of the present invention run a software environment on a client system that will create a test job that is sent to a test server. The test server would apply the test job to a semiconductor system under test (SUT) and read back result vectors. The server would then send the result vectors back to the client. It is contemplated that an interactive test system between the client and SUT would exist via the test server. The SUT can be any semiconductor system or device that can have vectors applied to inputs of the design and have their outputs or test points sampled at discrete times. Although the SUT system finds particular application as a programmable logic device (PLD), the system can be applied to other semi-conductor devices.

Figure 1:
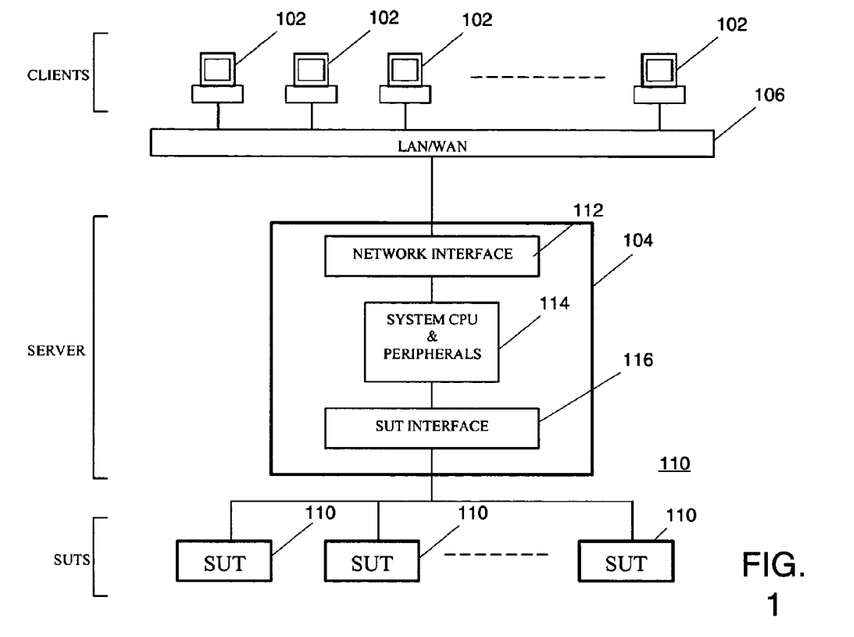
FIG. 1 is a block diagram of a system for verifying a semiconductor design according to an embodiment of the present invention.
Figure 2:
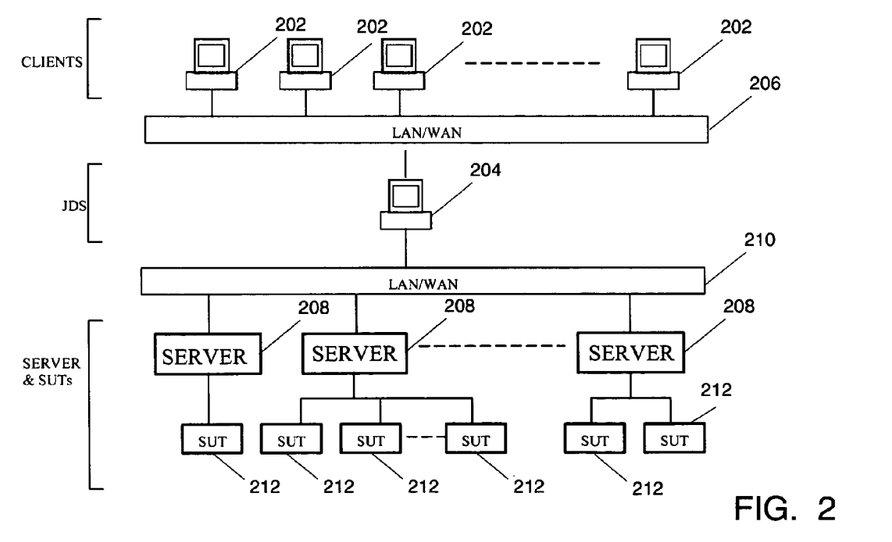
FIG. 2 is a block diagram of a system for verifying a semiconductor design according to an alternate embodiment of the present invention.

In a design flow, once functional and timing simulations have been completed, development will typically advance to the system prototyping stage. This stage involves running a prototype of the design, in test mode within a real life system, in order to test and evaluate the actual system implementation. The systems of FIGS. 1 and 2 provide, in addition to its other features, systems for applying the vectors generated from the behavioral testbench onto the actual inputs of the prototype system, without modification to either testbench or design implementation. The systems provide an extra level of verification, placed between functional verification and real time evaluation testing. According to another aspect of the invention, the test vectors can be run at higher bandwidths, reaching "real design speeds" for the purpose of timing closure or characterization, temperature and power analysis or other environmental analysis of the system running at full speed.

The systems of FIGS. 1 and 2 are inexpensive because only one test server is required. Multiple SUTs can be plugged in and shared among multiple clients from remote locations. SUTs could be developed as dedicated test adapters or could be actual prototype systems. If the target architecture contains PLDs, these can be reconfigured with different target designs for different applications under test. According to another aspect of the present invention, the systems of FIGS. 1 and 2 enable vectors to be generated from their existing simulation environments, or they could be generated from external vector generation software.

Multiple SUTs can be attached to the Test Server through various technologies, such as peripheral component interconnect (PCI), CoreConnect or an adaptive bus protocol depending on the application and implementation. The test server will execute test jobs on the SUTs and sample their outputs, sending results back to the client system so that the functionality can be evaluated. Some level of interactive debug can occur between client and SUT via the test server. As will be described in more detail in reference to FIGS. 3-5, the SUTs can also be dedicated adapters or prototype boards attached to the server via a test bus, or the SUT could be a design attached to a standard bus interface, for example Core IP connected to a CoreConnect Bus. As long as the server is capable of applying digital inputs to and sampling digital outputs from the SUT, then it can be connected using the required technology.

Referring specifically to FIG. 1, a block diagram of a system for verifying a semiconductor design according to an embodiment of the present invention is shown. In particular, a plurality of client devices 102 are coupled to a server 104 by way of a network 106. The network could be a type of local area network or wide area network commonly employed for enabling communication between computers. The server 104 enables communication with a plurality of systems under test 110. The server 104 preferably comprises a network interface 112 for enabling communication with the network 106 and a system under test interface 116. Finally, the system CPU 114 of the server controls the communication between the network 106 and the systems under test 110.

The system of FIG. 1 provides a general purpose verification system because any semiconductor System Under Test (SUT) that has digital inputs and outputs can be "plugged" in, and no alteration or additional circuitry/logic is required to the SUT for the purpose of applying test vectors. Also, no proprietary verification language is required for generating the test vectors. Rather, these vectors can be generated in various ways. One method is the extraction of test vectors from the SUT design behavioral model and testbench. After a design is implemented in RTL, a functionality test is performed against their behavioral model and testbench. Conventional simulations which are carried out by loading in vendor specific implementation models including timing information can take significant time to run. However, the systems according to embodiments of the present invention directly generate test vectors from their behavioral testbench and apply them to an actual SUT. Another method of extracting the vectors to be applied to the SUT is to read the expected outputs from the simulators output, which can be used to compare to the actual response vectors coming back from the system under test.

Further, the vectors do not need to be applied to the SUT at "real" design speed, which could interfere with functional testing by adding an extra level of complexity (e.g. timing closure). The vectors could be applied at a low frequency for a functionality test. However, it is contemplated that the vectors can be applied close to "real" design speeds with the use of data pumps and specialized circuitry surrounding the SUT, for the purpose of timing characterization. It is also possible to perform power/heat analysis and attach logic analyzers while monitoring the SUT. The SUT could be debugged through the test server, for example by using a purpose built software environment.

The systems of the embodiments of the present invention are inexpensive because of the simplicity of their implementation. The system is also inexpensive to the end user because only one test server is required to attach multiple SUTs or test adapters. The SUTs or test adapter could be created or purchased separately to plug into any semiconductor verification system. Because the server is detached from the clients, via a LAN/WAN, SUTs can be tested from remote locations. The vectors can be generated from existing simulation environments or via any alternative method if a simulator is not available. Accordingly, the system does not require a software simulation environment to generate the test vectors.

The client device will run a software environment on their host computer. The client device will include a method for generating a "test job" that would include stimuli vectors, expected result vectors, timing information and any other relevant information that will be applied to the semiconductor system under test. There are two main ways that the test job can be created. As will be described in more detail below, an interactive graphical user interface (GUI) environment or an external software simulation environment, such as ModelSim from Model Technology Inc. of Wilsonville, Oreg., could be used.

The interactive GUI could read in the design or testbench (in HDL or Schematic) and present a waveform construction display. The user could set the values of input signals and preferably set some expected output values. The client device would generate a test job from the data entered via the GUI.

The behavior of the semiconductor design is typically simulated before full implementation. A behavioral testbench may be created and used to simulate an RTL design. When the simulation is run in an environment such as ModelSim, it is possible to verify that the outputs are as expected. It is possible to extract the values of the input signals and the output signals from the simulation environment and then convert these to test vectors. There are several possible ways of generating test vectors. One way is to have the simulator generate a value change dump (VCD) file which is parsed to get the data. Another way is to use a programming language interface (PLI). It is also possible to insert extra HDL into the testbench to generate the vectors. Finally, it is possible to use scripting languages to generate the vectors, or to use the TCL programming language to insert a tool into simulation tool to extract vectors.

Having generated a "test job", the client would send this to the test server. The test server would run the job on the SUT and send results back to the client. The results would then be compared to the expected results and highlight any differences. The client environment could graphically display the results, or the results could be opened in a third party waveform viewer, such as Modeltech's Waveform Viewer. For tighter debug, breakpoints could be set in simulation and the test job could be run in an interactive mode, pausing the execution and stepping through sequences. Although the system is testing a "black box" and the only information returned from the test execution will be the SUT output values, no internal nodes are sampled. However, in order to bring out test points, it is possible to use debug IP, such as Chipscope from Xilinx Inc. of San Jose, Calif., or built in self test (BIST) technology if the SUT is a PLD. If the SUT is a circuit board, it is possible to probe test points in the circuit much like a logic analyzer does. It should be noted that the server can be used in an interactive debug mode as well as just sending test jobs.

The format of the test job itself is not essential to the system, and could come in different formats that the test server would recognize. For example, the simplest format could be a binary file of vectors, or other universal test vector formats. Alternatively, a dedicated format that could be designed so as to be more compact or would be formatted to enable higher throughput to the SUT. The dedicated format could be generated by converting from any universal or binary format.

Multiple clients can interact with the test server, and the test server can run test jobs on multiple SUTs. The test server will preferably have a microprocessor that will control communication from client devices via TCP as well as the administration of the SUTs and the test jobs, such as queuing. The SUTs can be physically connected to the test server in a variety of ways. As will be described in more detail in reference to FIGS. 3-5, a variety of systems under test can be employed by the system for verifying a semiconductor design.

The connection between the Server and the SUTs is implemented as a general purpose bus running an adaptive bus protocol. The communication between the Server and the SUT will mainly be concerned with SUT administrating such as in Plug and Play applications, programming configurable devices that are in SUTs, such as PLDs or memories—and coupling of vectors to and from the SUT.

It is intended that the semiconductor design be unmodified when under test. The test system is designed so that vectors can be applied to the actual inputs of the semiconductor system and the outputs read back from the actual outputs. Therefore, the test system does not insert or require any extra logic or circuitry to the SUT.

Another embodiment relates to a system having multiple test servers connected via LAN/WAN to one master server or a computer that will act as a job distribution system for all the SUTs connected to the various test servers. SUTs could be accessed from various remote locations where all SUTs are accessed and/or administered from one computer or server. As can be seen in FIG. 2, a block diagram of a system for verifying a semiconductor design according to an alternate embodiment of the present invention is shown. In particular, a plurality of client devices 202 are coupled to a job distribution server 204 by way of a first network 206. The job distribution server 204 is also coupled to a plurality of servers 208 by a second network 210. Finally, a plurality of systems under test 212 are coupled to the servers 208. Although the networks are shown as separate networks, the first and second network could comprise a single network which is accessible by the client devices 202 and the job distribution server 204.

Figure 3:
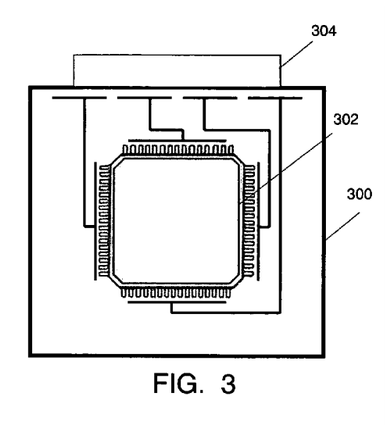
FIG. 3 is a system under test card employed by a system for verifying a semiconductor design according to an embodiment of the present invention.
Figure 4:
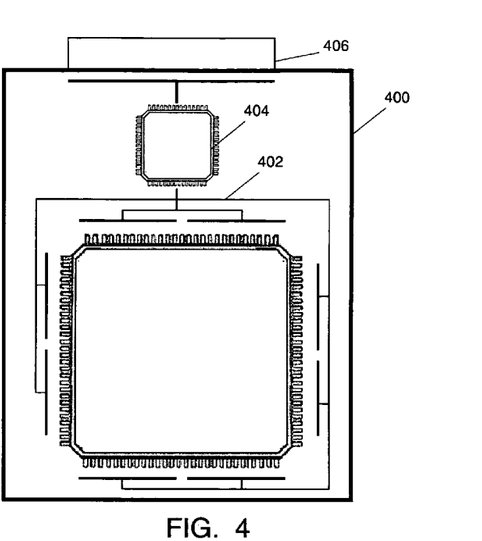
FIG. 4 is a system under test card employed by a system for verifying a semiconductor design according to an alternate embodiment of the present invention.
Figure 5:
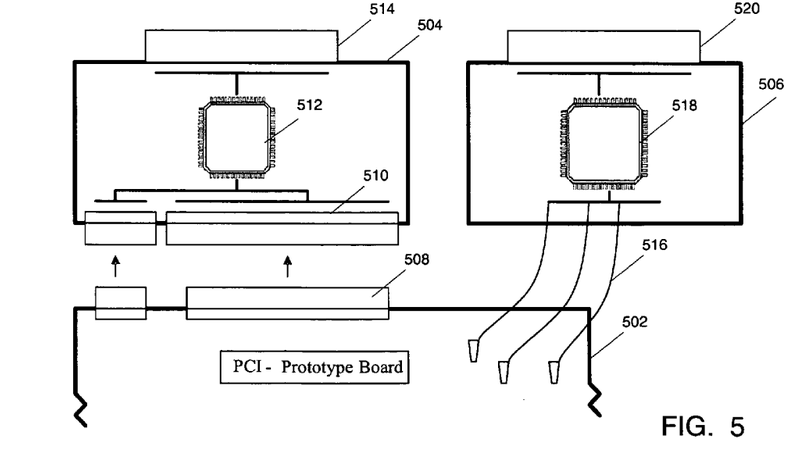
FIG. 5 is a system under test card employed by a system for verifying a semiconductor design according to another embodiment of the present invention.

The systems of some embodiments of the present invention enable a test server test bus using an adaptive protocol running across a general purpose bus on a backplane, with SUT cards attached to the backplane. The SUT cards preferably have a PLD device that is programmed via the backplane and then vectors are applied and read back to the server for the purpose of testing designs running in the PLDs. Each SUT connected could have a different PLD architecture, this would allow designs to be tested across different architectures at high speed. Some SUTs, such as the SUT of FIG. 3, are not "smart" devices, because they only have input vectors applied and outputs sampled. In particular, as shown for example in FIG. 3, a simple SUT adapter 300 comprising a PLD 302 coupled to a connector 304. However, other SUTs are smart because they have a controlling device to communicate with the test server. The test server will detect the SUT when connected and determine what type of SUT it is. If it is a smart SUT, it will know how to communicate with that particular SUT. Different types of 'smart' SUTs can use different communication protocols. In particular, a smart SUT adapter 400 comprising a PLD 402 is coupled to logic registers 404. The logic registers enable decomposition of larger vectors from PLD 402 into smaller vectors which are output by a connector 406. The logic registers also enable the concatenation of smaller vectors from connector 406 to make larger vectors which are coupled to PLD 402.

In order to run and sample vectors at high speed on the actual SUT adapter, it is unlikely that the Server will be able to transfer vectors at a sufficient rate across the communication bus between the two is employed. It could be possible however to store the vectors in a memory device on the SUT adapter, using the SUT adapter of FIG. 4, for example. The vectors could then be read and applied to the SUT at a higher frequency, while the server works on filling up the vector memory again to the lower test bus speed, employing a similar technique to that used in data acquisition systems. While these techniques add extra logic they do not interfere with the actual content of the design being verified.

It may be necessary to measure the behavior of the SUT as well as actually reading its outputs. Examples of this could be power measurement circuits, temperature measurement devices, etc. As was previously mentioned, in order to debug some internal nodes in circuits, or to bring out test signals from internal devices on the board, a logic analysis card could be connected with probes attached to the SUT, as shown for example in FIG. 5. In particular, a PCI prototype board 502 is adapted to be coupled to an SUT 504, as well as a logic analyzer card 506. The PCI prototype board 502 is coupled by way of connector 508 to a connector 510 of the SUT 504. The SUT 504 comprises a logic circuit 512 coupled to a connector 514 which is coupled to a server, such as a server of FIG. 2 or 3. Similarly, a logic analyzer card 506 comprises a logic circuit 518 coupled to a connector 520 which is also coupled to a server.

Figure 6:
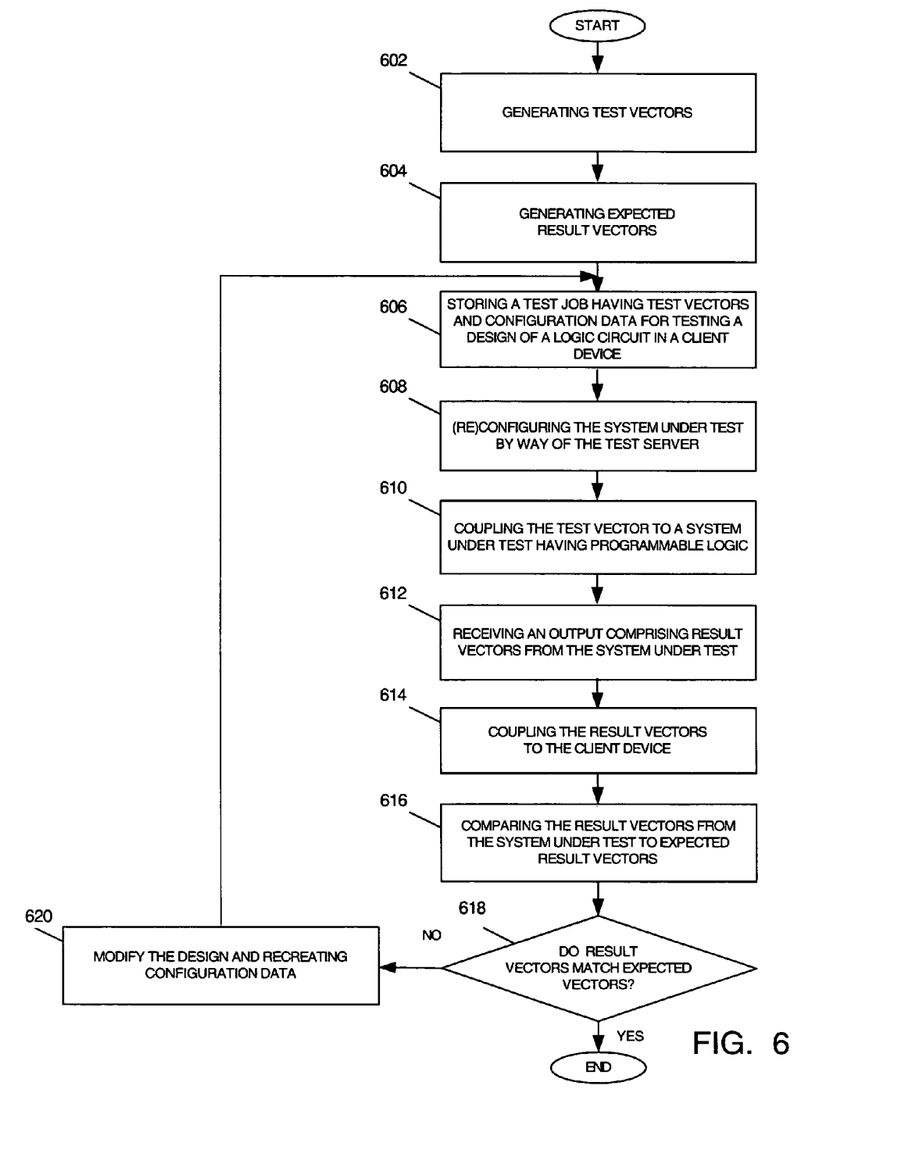
FIG. 6 is a flow chart showing a method of verifying a semiconductor design according to an embodiment of the present invention.

Turning now to FIG. 6, a flow chart shows a method of verifying a semiconductor design according to an embodiment of the present invention. In particular, test vectors are generated at a step 602. Expected result vectors are also generated at a step 604. For example, a circuit design may be described in Verilog and a set of test vectors created by the user. A ModelSim simulator may be used to generate the expected result vectors from the Verilog design and the test vectors. The Verilog circuit design may then be synthesized and place and routed using commercially available tools such as provided by Xilinx Inc. of San Jose, Calif. The tools generate configuration data that will be used to program the FPGA with the circuit design. A test job having the test vectors and the configuration data are stored in a client device at a step 606. The test server receives the configuration data and configures (or reconfigures) the system under test, e.g., FPGA, with the circuit design at a step 608. The test vectors are coupled to the system under test, e.g., the circuit design in the FPGA, via the test server at a step 610. An output comprising result vectors of the circuit design is received by the test server from the system under test at a step 612. Finally, the result vectors are coupled to the client device via the test server at a step 614. The result vectors from the system under test are compared to expected result vectors at the client device at a step 616. It is then determined whether the result vectors match the expected vectors at a step 618. If not, the circuit design is modified and new configuration data is generated at a step 620.

Figure 7:
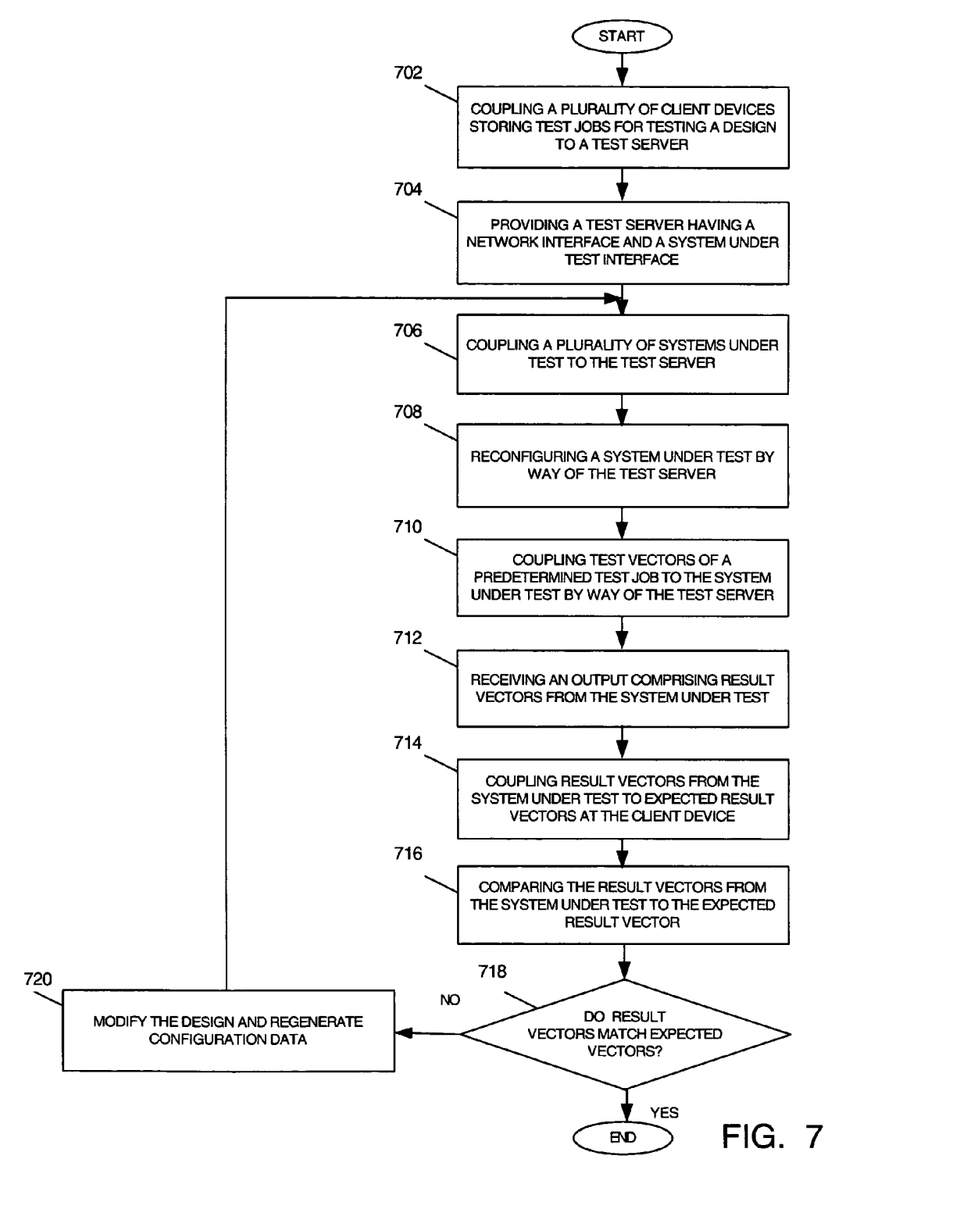
FIG. 7 is a flow chart showing a method of verifying a semiconductor design according to an alternate embodiment of the present invention.

Turning now to FIG. 7, a flow chart shows a method of verifying a semiconductor design according to an alternate embodiment of the present invention. In particular, a plurality of client devices storing test jobs for testing a design are coupled to a server at a step 702. A test server comprising a network interface and a system under test interface is provided a step 704. A plurality of systems under test are coupled to the test server at a step 706. The system under test is reconfigured by way of the test server at a step 708. The test vectors of a predetermined test job are coupled to the system under test by way of the test server at a step 710. An output comprising result vectors are received from the system under test at a step 712. The result vectors are coupled to a client device at a step 714. The result vectors from the system under test are then compared to the expected results vectors at a step 716. It is then determined whether the result vectors match the expected vectors at a step 718. If not, the design is modified and configuration data is generated at a step 720.

Figure 8:
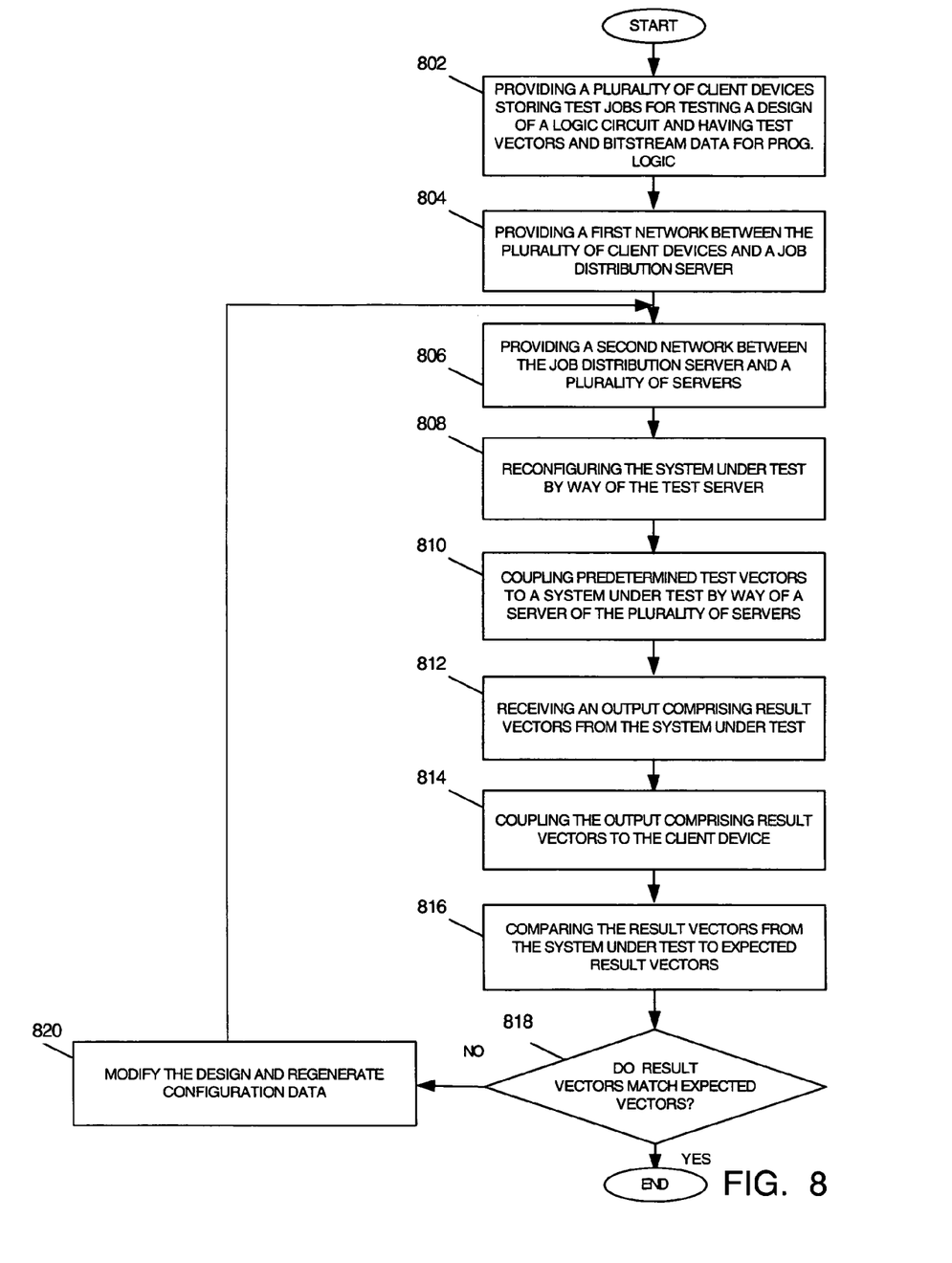
FIG. 8 is a flow chart showing a method of verifying a semiconductor design according to an alternate embodiment of the present invention.

Turning now to FIG. 8, a flow chart shows a method of verifying a semiconductor design according to an alternate embodiment of the present invention. A plurality of client devices storing test jobs for testing a design of a logic circuit and having test vectors and configuration data for programmable logic are provided at a step 802. A first network is provided between the plurality of client devices and a job distribution server at a step 804. A second network is provided between the job distribution server and a plurality of servers at a step 806. The system under test is reconfigured by way of the test server at a step 808. Predetermined test vectors are coupled to a system under test by way of a server of the plurality of servers at a step 810. An output comprising result vectors from the system under test are received at a step 812. The output comprising result vectors are coupled to a client device at a step 814. Finally, the result vectors from the system under test are compared to expected result vectors at a step 816. It is then determined whether the result vectors match the expected vectors at a step 818. If not, the design is modified and configuration data is generated at a step 820.

It can therefore be appreciated that the new and novel system for and method of verifying a semiconductor design has been described. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. A client-server semiconductor verification system, said system comprising:
    a plurality of client computers, wherein each client computer of said plurality generates a test job for testing a different design of a programmable logic circuit and comprises test vectors and configuration data for said different design of a programmable logic circuit;
    a server coupled to said plurality of client computers through a network interface, said server receiving a predetermined test job from a client computer; and
    a plurality of systems under test coupled to said server and shared among said plurality of client computers through said network interface under the control of said server, wherein each system under test of said plurality of systems under test has a different programmable logic device architecture, and wherein each system under test of said plurality of systems under test has a programmable logic circuit which is configured with said design of a programmable logic circuit implemented according to configuration data of said predetermined test job from said client computer through said network interface of said server and receives corresponding test vectors of said predetermined test job of said client computer and outputs result vectors to said client computer through said network interface of said server.

2. The system of claim 1 wherein said server comprises a system under test interface.

3. The system of claim 1 further comprising another server coupled to said plurality of client computers through said network interface.

4. A method of verifying a semiconductor design by way of a server, said method comprising the steps of:
    coupling a plurality of client computers to a test server, each said client computer storing a test job for testing a different design of a programmable logic circuit, each test job having test vectors and configuration data for said different design of a programmable logic circuit;
    providing a plurality of systems under test, each system under test having a different programmable logic device architecture and shared among the plurality of client computers through a network interface under the control of a test server;
    reconfiguring a programmable logic circuit of each system under test with a design of a programmable logic circuit stored in a client computer according to configuration data of a predetermined test job through said network interface of said test server;
    coupling corresponding test vectors of said predetermined test job for said design of a programmable logic circuit from said client computer to each system under test through said network interface of said test server;
    receiving an output comprising result vectors from each system under test; and
    comparing said result vectors from each system under test to expected result vectors.

5. The method of claim 4 further comprising a step of coupling said plurality of systems under test to said test server.

6. The method of claim 4 further comprising a step of providing a test server having a system under test interface.

7. The method of claim 6 further comprising a step of coupling said result vectors to said client computer through said network interface of said test server.

8. The method of claim 4 wherein said step of comparing said result vectors from each system under test to expected result vectors comprises comparing said result vectors from each system under test to expected result vectors at said client computer.

* * * * *